US010706644B2

(12) United States Patent
Cox et al.

(10) Patent No.: US 10,706,644 B2
(45) Date of Patent: *Jul. 7, 2020

(54) SYSTEMS AND METHODS FOR DETERMINING FUEL INFORMATION OF A VEHICLE

(71) Applicant: MetroMile, Inc., San Francisco, CA (US)

(72) Inventors: Evan Gabriel Turitz Cox, Pleasant Hill, CA (US); Muhammad Waliji, San Francisco, CA (US); Dan Richard Preston, Jr., San Francisco, CA (US); Jose Mercado, San Francisco, CA (US); Daniel Eric Goodman, Mountain View, CA (US)

(73) Assignee: METROMILE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/032,783

(22) Filed: Jul. 11, 2018

(65) Prior Publication Data

US 2019/0080527 A1    Mar. 14, 2019

Related U.S. Application Data

(63) Continuation of application No. 14/843,815, filed on Sep. 2, 2015, now Pat. No. 10,140,785.
(Continued)

(51) Int. Cl.
*G07C 5/02* (2006.01)
*G01C 21/26* (2006.01)
(Continued)

(52) U.S. Cl.
CPC .............. *G07C 5/02* (2013.01); *G01C 21/26* (2013.01); *G01F 9/02* (2013.01); *G01F 9/023* (2013.01);
(Continued)

(58) Field of Classification Search
None
See application file for complete search history.

(56) References Cited

U.S. PATENT DOCUMENTS

| 3,812,710 A | 5/1974 | Eisele et al. |
| 4,157,030 A | 6/1979 | Keely |
| (Continued) | | |

FOREIGN PATENT DOCUMENTS

| GB | 2427498 A | 12/2006 |
| WO | WO-0017610 A1 | 3/2000 |
| WO | WO-2016005972 A1 | 1/2016 |

OTHER PUBLICATIONS

Fazeen et al., "Safe Driving Using Mobile Phones", Sep. 2012, IEEE Transactions on Intelligent Transportation Systems, vol. 13, No. 3, p. 1462-1468 (Year: 2012).*
(Continued)

*Primary Examiner* — Tamara L Weber
(74) *Attorney, Agent, or Firm* — Wilson Sonsini Goodrich & Rosati

(57) ABSTRACT

The present disclosure provides systems and methods for determining or providing fuel information of a vehicle, such as predicting fuel intake and usage for the vehicle. A method for predicting a fueling event of a vehicle comprises using a mobile computing device carried in the vehicle to track the vehicle along a route. Multiple stop events may be detected when tracking the vehicle, and for each of the multiple stop events, each of duration and a geographic location may be determined. Next, a given stop event of the multiple stop events may be determined to be a fueling event based at least in part on a duration and geographic location of the given stop event.

19 Claims, 7 Drawing Sheets

Related U.S. Application Data

(60) Provisional application No. 62/044,986, filed on Sep. 2, 2014.

(51) Int. Cl.
*G01F 23/00* (2006.01)
*G01F 9/02* (2006.01)
*G01C 21/32* (2006.01)

(52) U.S. Cl.
CPC ......... *G01F 23/0061* (2013.01); *G01C 21/32* (2013.01)

(56) References Cited

U.S. PATENT DOCUMENTS

| | | | |
|---|---|---|---|
| 4,673,921 A | 6/1987 | Saito et al. |
| 5,303,163 A | 4/1994 | Ebaugh et al. |
| 5,550,738 A | 8/1996 | Bailey et al. |
| 5,913,917 A | 6/1999 | Murphy |
| 5,921,199 A | 7/1999 | Gross |
| 6,087,965 A | 7/2000 | Murphy |
| 6,122,572 A | 9/2000 | Yavnai |
| 6,141,609 A | 10/2000 | Herdeg et al. |
| 6,505,106 B1 | 1/2003 | Lawrence et al. |
| 6,590,534 B1 | 7/2003 | Kroll et al. |
| 6,694,258 B2 | 2/2004 | Johnson et al. |
| 6,741,933 B1 | 5/2004 | Glass |
| 7,532,974 B2 | 5/2009 | Sato et al. |
| 7,937,278 B1 | 5/2011 | Cripe et al. |
| 8,022,831 B1 | 9/2011 | Wood-Eyre |
| 8,090,598 B2 | 1/2012 | Bauer et al. |
| 8,180,293 B2 | 5/2012 | Jung et al. |
| 8,280,752 B1 | 10/2012 | Cripe et al. |
| 8,311,858 B2 | 11/2012 | Ling et al. |
| 8,332,242 B1 | 12/2012 | Medina, III |
| 8,498,777 B2 | 7/2013 | Sanchez-Prieto Aler et al. |
| 8,520,695 B1 | 8/2013 | Rubin et al. |
| 8,527,140 B2 | 9/2013 | Schwartz et al. |
| 8,560,216 B1 | 10/2013 | Kahn et al. |
| 8,610,597 B2 | 12/2013 | Stefik et al. |
| 8,793,062 B2 | 7/2014 | Fino |
| 8,799,036 B1 | 8/2014 | Christensen et al. |
| 8,816,879 B2 | 8/2014 | Stefik et al. |
| 8,843,307 B1 | 9/2014 | Kolodziej |
| 8,972,079 B2 | 3/2015 | Harumoto et al. |
| 9,053,469 B1 | 6/2015 | Bohanek et al. |
| 9,082,078 B2 | 7/2015 | Palmer et al. |
| 9,230,425 B2 | 1/2016 | Hamaue et al. |
| 9,372,831 B2 | 6/2016 | Harumoto et al. |
| 9,773,281 B1 | 9/2017 | Hanson |
| 9,812,015 B1 | 11/2017 | Cox et al. |
| 9,846,977 B1 | 12/2017 | Cox et al. |
| 10,036,639 B1 | 7/2018 | Cox et al. |
| 10,042,359 B1 | 8/2018 | Konrardy et al. |
| 10,055,382 B2 | 8/2018 | Min et al. |
| 10,140,785 B1 | 11/2018 | Cox et al. |
| 10,304,265 B1 | 5/2019 | Hsu-Hoffman et al. |
| 10,373,257 B1 | 8/2019 | Iqbal et al. |
| 10,375,525 B1 | 8/2019 | Snyder et al. |
| 10,397,744 B2 | 8/2019 | Mukhtar et al. |
| 10,475,128 B2 | 11/2019 | Biemer et al. |
| 10,482,685 B1 | 11/2019 | Iqbal et al. |
| 10,521,733 B2 | 12/2019 | Snyder et al. |
| 2003/0229446 A1 | 12/2003 | Boscamp et al. |
| 2004/0123837 A1 | 7/2004 | Rado |
| 2004/0225557 A1 | 11/2004 | Phelan et al. |
| 2005/0137757 A1 | 6/2005 | Phelan et al. |
| 2005/0228553 A1 | 10/2005 | Tryon |
| 2005/0240347 A1 | 10/2005 | Yang |
| 2006/0042232 A1 | 3/2006 | Fulcher et al. |
| 2006/0095301 A1 | 5/2006 | Gay |
| 2006/0111835 A1 | 5/2006 | Baker et al. |
| 2006/0212195 A1 | 9/2006 | Veith et al. |
| 2007/0083327 A1 | 4/2007 | Brice et al. |
| 2007/0123270 A1 | 5/2007 | Casey |
| 2007/0262855 A1 | 11/2007 | Zuta et al. |
| 2007/0294030 A1 | 12/2007 | Jones et al. |
| 2008/0039988 A1 | 2/2008 | Estabrook et al. |
| 2008/0091347 A1 | 4/2008 | Tashiro |
| 2008/0252487 A1 | 10/2008 | McClellan et al. |
| 2008/0312969 A1 | 12/2008 | Raines et al. |
| 2009/0098907 A1 | 4/2009 | Huntzicker et al. |
| 2009/0309759 A1 | 12/2009 | Williams |
| 2010/0073158 A1 | 3/2010 | Uesaka et al. |
| 2010/0073201 A1 | 3/2010 | Holcomb et al. |
| 2010/0106416 A1 | 4/2010 | Yochum |
| 2010/0161209 A1 | 6/2010 | Vaghefinazari |
| 2010/0185479 A1 | 7/2010 | Brinton et al. |
| 2010/0238009 A1 | 9/2010 | Cook et al. |
| 2011/0022263 A1 | 1/2011 | Sanchez-Prieto Aler et al. |
| 2011/0060600 A1 | 3/2011 | Fox et al. |
| 2011/0077028 A1 | 3/2011 | Wilkes, III et al. |
| 2011/0092159 A1 | 4/2011 | Park et al. |
| 2011/0106370 A1 | 5/2011 | Duddle et al. |
| 2011/0137508 A1 | 6/2011 | Garcia |
| 2011/0161116 A1 | 6/2011 | Peak et al. |
| 2011/0196601 A1 | 8/2011 | Miura et al. |
| 2011/0301806 A1 | 12/2011 | Messier et al. |
| 2011/0313647 A1 | 12/2011 | Koebler et al. |
| 2012/0078671 A1 | 3/2012 | Mohebbi et al. |
| 2012/0092190 A1 | 4/2012 | Stefik et al. |
| 2012/0095792 A1 | 4/2012 | Stefik et al. |
| 2012/0173075 A1 | 7/2012 | Mays |
| 2012/0191242 A1 | 7/2012 | Outwater et al. |
| 2012/0209634 A1 | 8/2012 | Ling et al. |
| 2013/0006674 A1 | 1/2013 | Bowne et al. |
| 2013/0013348 A1 | 1/2013 | Ling et al. |
| 2013/0046510 A1 | 2/2013 | Bowne et al. |
| 2013/0046562 A1 | 2/2013 | Taylor et al. |
| 2013/0122928 A1 | 5/2013 | Pfluger |
| 2013/0151037 A1 | 6/2013 | Harumoto et al. |
| 2013/0173147 A1* | 7/2013 | Takeuchi ............... G01C 21/32 701/123 |
| 2013/0245880 A1 | 9/2013 | McQuade |
| 2013/0317665 A1 | 11/2013 | Fernandes et al. |
| 2013/0344856 A1 | 12/2013 | Silver et al. |
| 2014/0028477 A1 | 1/2014 | Michalske |
| 2014/0067246 A1 | 3/2014 | Eldredge et al. |
| 2014/0085109 A1 | 3/2014 | Stefik et al. |
| 2014/0176348 A1 | 6/2014 | Acker, Jr. et al. |
| 2014/0180727 A1 | 6/2014 | Freiberger et al. |
| 2014/0236719 A1 | 8/2014 | Szostak et al. |
| 2014/0257867 A1 | 9/2014 | Gay et al. |
| 2014/0257869 A1 | 9/2014 | Binion et al. |
| 2014/0266594 A1 | 9/2014 | Reiser |
| 2014/0309813 A1 | 10/2014 | Ricci |
| 2014/0309855 A1 | 10/2014 | Tran |
| 2014/0335902 A1 | 11/2014 | Guba et al. |
| 2015/0019266 A1 | 1/2015 | Stempora |
| 2015/0145695 A1 | 5/2015 | Hyde et al. |
| 2015/0154711 A1 | 6/2015 | Christopulos et al. |
| 2015/0170289 A1 | 6/2015 | Bowne et al. |
| 2015/0187013 A1 | 7/2015 | Adams et al. |
| 2015/0187015 A1 | 7/2015 | Adams et al. |
| 2015/0187019 A1 | 7/2015 | Fernandes et al. |
| 2015/0226563 A1 | 8/2015 | Cox et al. |
| 2015/0228129 A1 | 8/2015 | Cox et al. |
| 2016/0033291 A1 | 2/2016 | Inoue et al. |
| 2016/0101786 A1 | 4/2016 | Johnson |
| 2016/0379310 A1 | 12/2016 | Madigan et al. |
| 2018/0204396 A1 | 7/2018 | Cox et al. |

OTHER PUBLICATIONS

Co-pending U.S. Appl. No. 15/476,549, filed Mar. 31, 2017.
Co-pending U.S. Appl. No. 15/789,917, filed Oct. 20, 2017.
Hemminki, et al. Accelerometer-Based Transportation Mode. SenSys '13 Proceedings of the 11th ACM Conference on Embedded Networked Sensor Systems. Article No. 13. 2013. 14 pages.
Notice of Allowance dated Jul. 3, 2017 for U.S. Appl. No. 14/842,736.
Notice of Allowance dated Aug. 15, 2017 for U.S. Appl. No. 14/843,853.

(56) References Cited

OTHER PUBLICATIONS

Notice of Allowance dated Sep. 27, 2017 for U.S. Appl. No. 14/842,736.
Notice of Allowance dated Oct. 25, 2017 for U.S. Appl. No. 14/843,853.
Office Action dated Jan. 27, 2017 for U.S. Appl. No. 14/843,853.
Office action dated Apr. 18, 2016 for U.S. Appl. No. 14/177,192.
Office Action dated Apr. 21, 2017 for U.S. Appl. No. 14/177,188.
Office action dated Apr. 23, 2015 for U.S. Appl. No. 14/177,188.
Office Action dated May 10, 2017 for U.S. Appl. No. 14/177,192.
Office Action dated May 26, 2017 for U.S. Appl. No. 14/843,815.
Office action dated Jun. 7, 2016 for U.S. Appl. No. 14/843,853.
Office action dated Jul. 1, 2016 for U.S. Appl. No. 14/842,736.
Office action dated Aug. 17, 2016 for U.S. Appl. No. 14/843,815.
Office action dated Sep. 12, 2016 for U.S. Appl. No. 14/177,188.
Office Action dated Sep. 14, 2017 for U.S. Appl. No. 14/842,753.
Office Action dated Sep. 28, 2017 for U.S. Appl. No. 14/843,815.
Office action dated Sep. 29, 2015 for U.S. Appl. No. 14/177,192.
Office action dated Sep. 29, 2016 for U.S. Appl. No. 14/177,192.
Office Action dated Nov. 28, 2016 for U.S. Appl. No. 14/842,736.
Office action dated Dec. 18, 2015 for U.S. Appl. No. 14/177,188.
Reddy, et al. Using mobile phones to determine transportation modes. ACM Trans. Sensor Netw. 6, 2, Article 13 (Feb. 2010), 27 pages. DOI = 10.1145/1689239.1689243 http://doi.acm.org/10.1145/1689239.1689243.
Shoaib, et al. A Survey of Online Activity Recognition Using Mobile Phones. Sensors 2015, 15, 2059-2085; doi:10.3390/s150102059.
Stenneth, et al. Transportation Mode Detection using Mobile Phones and GIS Information. ACM SIGSPATIAL GIS '11, Nov. 1-4, 2011. Chicago, IL, USA. 54-63.
U.S. Appl. No. 14/842,753 Notice of Allowance dated Mar. 28, 2018.
U.S. Appl. No. 14/843,815 Notice of Allowance dated Apr. 12, 2018.
U.S. Appl. No. 14/842,753 Notice of Allowance dated Jun. 25, 2018.
U.S. Appl. No. 14/843,815 Notice of Allowance dated Jun. 25, 2018.
U.S. Appl. No. 15/476,549 Office Action dated Feb. 6, 2020.
U.S. Appl. No. 15/811,928 Office Action dated Dec. 11, 2019.
U.S. Appl. No. 15/476,549 Office Action dated Apr. 17, 2019.
U.S. Appl. No. 15/789,917 Office Action dated Aug. 19, 2019.
U.S. Appl. No. 15/811,928 Office Action dated Apr. 4, 2019.

\* cited by examiner

SYSTEMS AND METHODS FOR DETERMINING FUEL INFORMATION OF A VEHICLE

CROSS-REFERENCE

This application is a Continuation Application which claims the benefit of U.S. application Ser. No. 14/843,815, filed Sep. 2, 2015, which claims the benefit of U.S. Provisional Application No. 62/044,986, filed Sep. 2, 2014, each of which is entirely incorporated herein by reference.

BACKGROUND

A vehicle is typically a mobile machine that transports people or cargo from one point to another. Vehicles may be manufactured, such as wagons, bicycles, motor vehicles (motorcycles, cars, trucks, buses), railed vehicles (trains, trams), watercraft (ships, boats), aircraft and spacecraft. Land vehicles may be classified broadly by what is used to apply steering and drive forces against the ground.

Vehicles increasingly rely on computers and sensors for a variety of purposes. With time, information determined from a vehicle gets more sophisticated, and more comprehensive about a variety of aspects relating to the operation of a vehicle.

SUMMARY

The present disclosure provides systems and methods for determining or providing fuel information of a vehicle, such as predicting fuel intake and usage for the vehicle. Such systems and methods can advantageously provide a driver or passenger on a vehicle with (i) accurate feedback as to the vehicle's fuel consumption rate (e.g., distance traveled divided by volume of fuel used), (ii) optimal locations where refueling may occur (e.g., based on fuel cost and/or time needed to refuel), (iii) an estimated location where a vehicle may run out of fuel, and/or (iv) a time and/or location on a route where a vehicle may run out of fuel if refueling is not performed.

An aspect of the present disclosure provides a method for predicting a fueling event of a vehicle, comprising (a) using a mobile computing device carried in the vehicle to track the vehicle along a route; (b) detecting multiple stop events when tracking the vehicle; (c) for each of the multiple stop events, determining each of a duration and a geographic location; and (d) using one or more programmed computer processors to determine that a given stop event of the multiple stop events is a fueling event based at least in part on a duration and geographic location of the given stop event.

In some embodiments, the method further comprises tracking the vehicle after the given stop event; determining that the fueling event filled a gas tank of the vehicle; and predicting a fuel level of the vehicle after the given stop event. In some embodiments, the method further comprises determining sensor information from the mobile computing device; and using the one or more programmed computer processors to relate the sensor information to one or more roadway characterizations along the route, wherein predicting the fuel level is based at least in part on the one or more roadway characterizations. In some embodiments, the sensor information includes accelerometer data from the mobile computing device. In some embodiments, determining the sensor information includes detecting elevation changes of the vehicle along the route. In some embodiments, detecting elevation changes of the vehicle is based on accelerometer data and/or Global Positioning System data from the mobile computing device that is carried in the vehicle.

In some embodiments, the method further comprises determining at least one of a velocity and acceleration profile of the vehicle; and determining a fuel consumption rate based on at least one of the of the velocity and acceleration profile. In some embodiments, the method further comprises determining a road condition for the vehicle, and determining the fuel consumption rate based on the road condition. In some embodiments, the road condition corresponds to an elevation change along the route of the vehicle and/or a quality of a road in used by the vehicle along the route. In some embodiments, the method further comprises determining a fuel level of the vehicle based on a geographic location of the given stop event and the fuel consumption rate. In some embodiments, the method further comprises determining that a fuel level of the vehicle is below a low fuel level threshold based on the fuel consumption rate and the geographic location of the fuel stop. In some embodiments, the method further comprises performing one or more of (i) generating an alert based on the fuel level of the vehicle being below the low fuel level threshold, (ii) locating an optimal fuel station based on proximity to a current or future geographic location of the vehicle before the vehicle is out of fuel, and (iii) determining a geographic location on a future route or route segment in which the vehicle is expected to be out of fuel.

In some embodiments, tracking the vehicle includes obtaining position information from the mobile computing device. In some embodiments, (a) through (d) are performed using global positioning system information generated from the mobile computing device. In some embodiments, (d) includes determining that a given stop of the multiple stop events was a fuel stop based at least in part on the duration of the given stop being greater than a first threshold and less than a second threshold. In some embodiments, (b)-(d) are performed by the mobile computing device.

In another aspect, a method for determining a fuel level of a vehicle, comprises recording, in computer memory, sensor device data from a mobile computing device along a route traveled by the vehicle, wherein the mobile computer device is in the vehicle, and wherein the sensor device data includes position information; determining, from the sensor device data, one or more roadway conditions and/or events along the route; and using one or more programmed computer processors to calculate the fuel level of the vehicle at a given instance by (i) determining, from the position information, a distance traveled by the vehicle since a most recent fuel stop, and (ii) calculating a fuel consumption rate based on (A) a fuel consumption rate for a vehicle type of the vehicle, and (B) the one or more roadway conditions and/or events.

In some embodiments, the method further comprises predicting the most recent fuel stop using the sensor device data. In some embodiments, determining the one or more roadway conditions and/or events includes using the position information to detect changes in elevation of the vehicle along the route when the sensor device data is recorded. In some embodiments, the sensor device data includes accelerometer information, and wherein determining the one or more roadway conditions and/or events includes using the accelerometer information to detect changes in elevation of the vehicle along the route when the sensor device data is recorded. In some embodiments, the method further comprises determining, from the sensor device data, at least one of a velocity and acceleration of the vehicle at multiple instances along the route.

Another aspect provides a method for planning fuel intake on a vehicle, comprising recording, in computer memory, sensor device data from a mobile computing device along a route traveled by the vehicle, wherein the mobile computer device is in the vehicle, and wherein the sensor device data includes position information; determining, from the sensor device data, at least one of a velocity and acceleration of the vehicle at multiple instances along the route; determining, from the sensor device data, one or more roadway conditions and/or events along the route; using one or more programmed computer processors to calculate a fuel consumption rate of the vehicle based at least in part on (A) an approximate fuel consumption rate for a vehicle type of the vehicle, (B) the at least one of velocity and acceleration of the vehicle at the multiple instances along the route, and (C) the one or more roadway conditions and/or events; predicting, based at least in part on the fuel consumption rate, when a fuel level of the vehicle is at or below a predetermined fuel threshold; and selecting a fuel station for the vehicle based at least in part on a refueling cost.

In some embodiments, the refueling cost is determined by the mobile computing device. In some embodiments, selecting the fuel station includes predicting at least a portion of one or more routes of the vehicle on either a current trip that includes the route or next trip, and selecting the fuel station based on the predicted one or more routes. In some embodiments, predicting the at least the portion of one or more routes includes using historical information.

In another aspect, a system for determining or providing fuel information of a vehicle (e.g., predicting a fuel event, determining fuel level, or planning for fuel intake) comprises one or more computer processors that are individually or collectively programmed to implement any of the methods above or elsewhere herein.

In another aspect, a non-transitory computer readable medium comprises machine executable code that, upon execution by one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
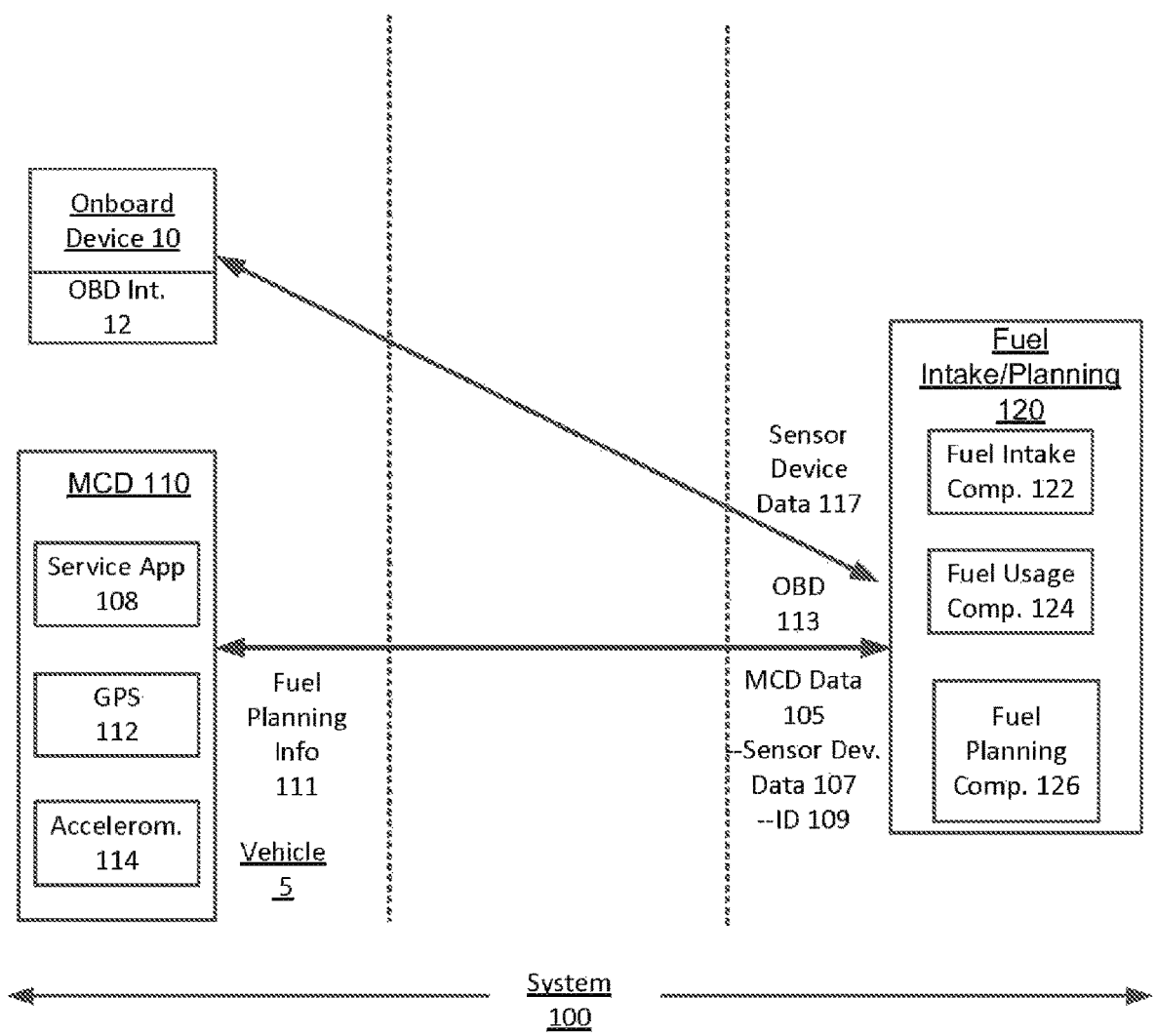
FIG. 1 illustrates an example system for predicting fuel intake and/or usage for a vehicle, in accordance with some embodiments.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "trip," as used herein, generally refers to an act of traveling from one point to another. A trip can include traveling to a place and returning. A trip can be made with a vehicle, such as a car, truck, motorcycle, scooter, or bicycle. A trip can be made along a route. The route can have one or more start and stop points.

Examples described herein include a system and method for utilizing sensor device data provided from within a vehicle to predict fuel usage and/or fuel planning for the vehicle. In some embodiments, the sensor device data originates from a handset, such as a mobile computing device of the user. Thus, no specialized equipment is needed in order to implement some embodiments, as described below. As described with some examples, sensor device data can accurately predict fuel consumption and fuel levels of the vehicle. Furthermore, the fuel consumption and fuel level information can be used as a basis for making intelligent fuel planning decisions, such as which fuel stations a vehicle should use and at what time.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer programs, or a computer usable carrier medium capable of carrying such a program.

FIG. 1 illustrates an example system for predicting fuel intake and/or usage for a vehicle, according to an embodiment. Among other benefits, a system 100 such as described with an example of FIG. 1 can be implemented to provide drivers with (i) accurate feedback as to the vehicle's fuel consumption rate (e.g., distance traveled divided by volume of fuel used), (ii) notifications as to optimal locations where refueling should occur (e.g., based on fuel cost and/or time needed to refuel), (iii) an estimated location where a vehicle will run out of fuel, and/or (iv) a time or location on a route where a vehicle will run out of fuel if refueling is not done. Additionally, in some variations, predictive fuel consumption and/or intake processes can be performed using information determined from a user's handheld or mobile computing device (e.g., smart phone or a telephony/messaging device), without use of additional equipment or the vehicle's onboard diagnostic data.

In one embodiment, a system 100 includes a mobile computing device (MCD) 110 and a fuel intake and/or planning service 120. The MCD 110 may be removable from the vehicle. The mobile computing device 120 can include a user interface, such as a graphical user interface (GUI). The user interface can present information to a user, such as vehicle information (e.g., route or fuel level) and alerts (e.g., fuel level alerts). The user interface can be a passive display or an active touch display (e.g., a capacitive or resistive touch screen).

In an example of FIG. 1, fuel intake and/or planning service 120 can be provided as a network service, accessible to the mobile computing device over a network. The mobile computing device 110 can be situated in a vehicle 5 (e.g., in the pocket of a driver, on car seat or divider etc.). Thus, the mobile computing device 110 can be readily carried into and out of the vehicle 5. The mobile computing device 110 can further include a set of sensors and/or other resources for obtaining information about the geographic position and movement of the mobile computing device 110. In particular, the mobile computing device 110 can include a global positioning system (GPS) component 112 and one or more accelerometers 114. The GPS component 112 operates to determine the location of the mobile computing device 110 at individual instances of time. The accelerometer 114 operates to determine the acceleration of the mobile computing device 110 at individual instances of time.

When the vehicle 5 is in motion, the mobile computing device 110 communicates data ("MCD data 105") to the fuel intake/planning service 120. The MCD data 105 can include sensor device data 107 and an identifier 109. In one implementation, the mobile computing device 110 executes a service application 108 that (i) generates MCD data 105, (ii) establishes a connection with the fuel intake/planning service 120, and (iii) transmits the MCD data 105 to the fuel intake/planning service 120.

The service application 108 can interface with the GPS component 112 to obtain position information for the mobile computing device 110 when the vehicle 5 is in motion. Additionally, the service application 108 can interface with the accelerometer 114 in order to determine acceleration information. In one implementation, the service application 108 causes the mobile computing device 110 to transmit sensor device data 107 that includes position information. As an addition or variation, the sensor device data 107 can include accelerometer information.

The identifier 109 can specify an account, user, or vehicle. The fuel intake/planning service 120 can use the identifier 109 to link information generated from the mobile computing device 110 with an account. This allows for the fuel intake/planning service 120 to maintain historical information that can subsequently be used to make predictive determinations about fuel intake and/or use, as described below.

The fuel intake/planning service 120 can include one or more of fuel intake component 122, fuel usage component 124 and/or fuel planning component 126. The fuel intake component 122 provides a programmatic mechanism to determine when the vehicle 5 has a fuel stop for refueling. As a programmatic mechanism, the fuel intake component 122 can substantially automate the determination of when refueling takes place in a vehicle, without use of vehicle sensors or vehicle data. By enabling the determination of when refueling takes place, examples described herein further can enable predictive determinations for fuel consumption and fuel levels of the vehicle 5. Furthermore, the fuel intake component 122 can operate to make its predictive determinations using the sensor device data 107 provided from the mobile computing device 110.

The fuel usage component 124 determines (i) the fuel level of the vehicle at a given instances of time, and/or (ii) a fuel consumption rate that accounts for driving style and road conditions. The fuel usage component 124 can be based in part on determinations of when refueling takes place, as determined by fuel intake component 122. Furthermore, the fuel usage component 124 can account for driving style and road conditions using the sensor device data 107.

The fuel planning component 126 can provide planning information 111 to the driver for purpose of refueling. In one implementation, fuel planning component 126 can programmatically generate intelligent recommendations for the driver as to when and/or where the vehicle should be refueled, given an estimated fuel level of the vehicle, and a predicted route (or routes) of travel in the future. The planning information 111 can also estimate when and/or where the vehicle would run out of fuel in the absence of refueling. For example, the planning information can predict the completion of the current route, or a route on a next trip, in order to identify a geographic location (geolocation) on an upcoming route where the vehicle is expected to run out of fuel. Vehicle information may be determined telematically using, for example, a combination of geolocation information (e.g., GPS information) and an electronic device (e.g., mobile computing device) in the vehicle.

While an example of FIG. 1 provides for the component of fuel intake/planning service 120 to be situated remotely from the mobile computing device 110, alternative variations provide for some or all of the processes used by the individual components to be local to the mobile computing device 110. For example, the mobile computing device 110 can perform some or all of the calculations used by fuel intake component 122 and/or fuel usage component 124.

Still further, some implementations may also include one or more vehicle devices or interfaces from which data is received for implementing the components and logic of the fuel intake/planning service 120. In particular, one variation provides for the vehicle 5 to include an onboard device 10 having one or more sensors for determining position, orientation and/or characteristics of movement (e.g., GPS, magnetometer, accelerometer, gyroscope, etc.).

The onboard device 10 can communicate its sensor information ("sensor device data 117") as an alternative to the sensor device data 107 of the mobile computing device 110. As an alternative or variation, the sensor device data 117 of the onboard device 10 can supplement or augment the sensor device data 107 of the mobile computing device 110. The onboard device 10 can communicate with the fuel intake/planning service 120 through mobile computing device 110. Alternatively, the onboard device 10 can communicate directly with the fuel intake/planning service 120. In this way, the onboard device 10 can provide a mechanism for generating the sensor data used by the components and logic of the fuel intake/planning service 120 when, for example, the driver does not have or wish to use a mobile computing device 110 in the vehicle 5.

Still further, the onboard device 10 can be implemented in a manner that provides some advantages in terms of sensor output. For example, mobile computing device 110 can be subjected to extraneous movement within a vehicle, either by the user (e.g., making a phone call) or by the vehicle's motion. Because of the movement, the accelerometer information that can otherwise be determined from the mobile computing device 110 may be unreliable for purposes of predictive determinations made by the components of the fuel intake/planning service 120. However, the onboard device 10 can be fixed to the vehicle, so that the accelerometer information, as well as other sensor output (e.g., gyroscope) can incur less interference from extraneous movements from the user or vehicle environment.

Still further, in some variations, the onboard device 10 can also include a vehicle interface 12 for receiving onboard diagnostic data ("OBD data 113") from the vehicle 5. The OBD data 113 can provide readings from the vehicle's own sensors which are indicative of information such as when refueling takes place. However, OBD data 113 can be noisy, and sometimes lacks precision, such as to the exact point in time when, for example, refueling takes place.

Figure 2:
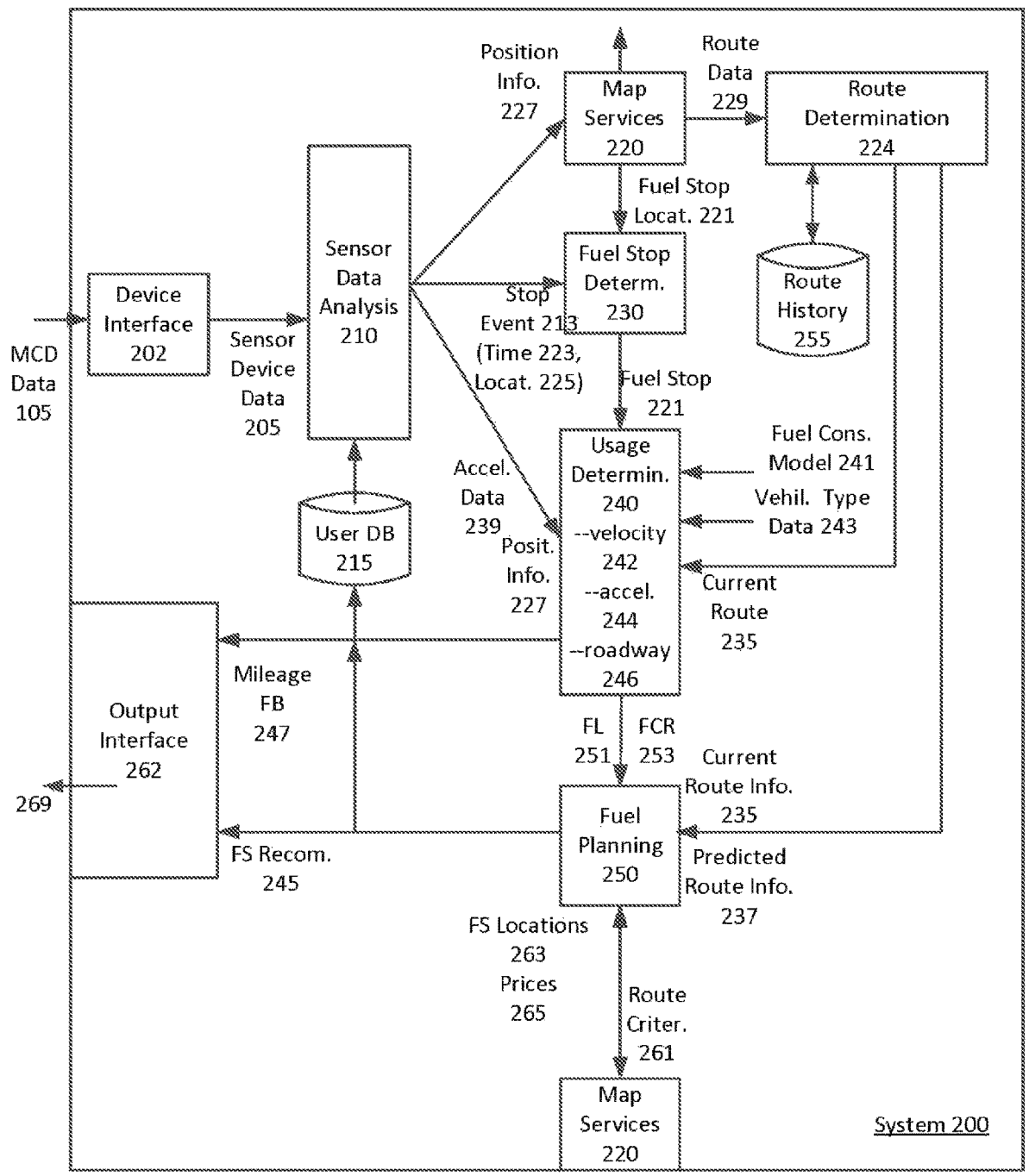
FIG. 2 illustrates a system for implementing a fuel intake and/or planning service, in accordance with some embodiments.

FIG. 2 illustrates a system for implementing a fuel intake and/or planning service, according to an embodiment. For example, system 200 of FIG. 2 can be used to implement the fuel intake/planning service 120 of FIG. 1. In one implementation, system 200 is implemented on a server (or combination of servers) in order to communicate with a mobile computing device 110, or other computing device within the vehicle 5 (such as onboard device 10). In variations, some or all of the components of system 200 can be implemented on the mobile computing device 110, which is carried in the vehicle 5. Still further, components of the system 200 can be distributed between the mobile computing device and server.

According to an example of FIG. 2, system 200 includes a device interface 202, a sensor data analysis component 210, a map service 220, and one or more of (i) a fuel stop determination component 230, (ii) a fuel usage determination component 240, or (iii) a fuel planning component 250. The fuel stop determination component 230 provides an example of the fuel intake component 122 of FIG. 1. Likewise, the usage determination component 240 provides an example of the fuel usage component 124 described with FIG. 1. The fuel planning component 250 also provides an example of the fuel planning component described with FIG. 1.

In one implementation, device interface 202 establishes a connection or communication channel with the mobile computing device of a driver. As shown with an example of FIG. 1, the mobile computing device 110 can be carried into the vehicle by the driver, and an application can be executed on the mobile computing device to generate MCD data 105. The device interface 202 receives the MC data 105, and associates the incoming data with the user or account. Additionally, subsequent determination that are made from the MC data 105 can be stored as historical information in a user database 215.

The device interface 202 can provide sensor device data 205 to the sensor data analysis component 210. In one implementation, sensor device data 205 can coincide with, or be based on, the sensor device data 107 communicated from the mobile computing device 110. In a variation in which the onboard device 10 is provided, the sensor device data 205 can include the sensor device data 117 of the onboard device.

In one implementation, sensor data analysis component 210 communicates data corresponding to stop events 213 to the fuel stop determination component 230. The stop events 213 can include timing information 223 and a location 225 where the stop event occurred. The fuel stop determination component 230 can use the location 225 to determine the proximity of the vehicle to a fueling station. The location of fueling stations at or near the location 225 can be determined from the map service 220. The map service 220 can, for example, correspond to an interface to third-party map services. In an example of FIG. 1, the map service 220 provides the fuel stop determination component 230 with one or more fuel stop locations 221 which are at or near the location 225. The fuel stop determination component 230 makes a determination as to whether the location 225 of the individual stop events are within a distance threshold to a fuel station, based on the locations 221 provided by the map service 220. The timing information 223 can also be analyzed to determine if the duration of any of the stop events satisfy timing criteria for determining that a stop event is a refueling stop. Specifically, the timing criteria 223 can correspond to a duration for the stop event that exceeds a minimum threshold but is less than a maximum threshold. The minimum threshold may correspond to time typically needed for a driver to refuel a vehicle (e.g., 3-5 minutes, depending on the type of vehicle). The maximum threshold can be indicative that the stop event was for a purpose other than refueling. For example, if the stop event last more than 30 minutes, the determination can be that the stop event was not a refueling stop. If the distance threshold is met, and the timing information 223 satisfies the timing criteria, the stop event may be deemed a fuel stop.

In some implementations, the determination that a stop event is a refueling stop can be made retroactively, based on, for example, fuel consumption and/or fuel level determinations made for the vehicle. For example, the vehicle may be viewed as being low on fuel (e.g., based on fuel level prediction), but the vehicle continues on without a determined fuel stop until the point is exceeded where the vehicle could have gone. In such instances, fuel stop determination 230 can retroactively analyze prior stop events to determine which stop event was most likely a refueling stop, based on location and/or timing. For example, if a prior stop event near a refueling station exceeded the maximum time limit for the timing criteria, but no other stop events met the minimum threshold when near a refueling station, then the determination can be that the prior stop of was in fact a refueling stop because the vehicle must have been refueled at some point in that segment of time.

In variations in which OBD data 113 or other sensor information from the vehicle is generated, the fuel stop determination component 230 can utilize information such as ignition on/off to exclude stop events in which the ignition remained on. Still further, some vehicles provide for OBD data 113 that reports fuel level. However, this data can be noisy, with fuel level values that fluctuate. In one variation, fuel stop determination component 230 can pinpoint the time when a fuel stop occurred based on fuel level information provided in the OBD data 113. For example, the fuel determination component can pinpoint the time of the fuel stop by determining mean fuel levels at multiple instances before and after a given point in time. The given point in time can be selected randomly, or it can be based on a detected stop event 213. The mean value of the fuel levels after the given point of time is compared to the mean value of the fuel levels before the given point of time, and if the comparison yields that the fuel levels in the after period exceed those of the before period by some additional delta or metric (e.g., 2 or 3 times the standard deviation for the before period), then the particular stop event can be deemed a refueling stop.

Under one implementation, the fuel stop determination component 230 assumes the vehicle is completely refueled at each fuel stop. In some variations, the user can be provide an interface (e.g., through the service application 108) to enter input indicating a less than complete refueling (e.g., "half-tank" or "5 gallons").

This sensor data analysis component 210 can also communicate the position information 227 to the usage determination component 240. The position information 227 can correspond to real-time GPS data received from the mobile computing device 110 (or onboard device 10) when the vehicle 5 is on a trip. The position information 227 can also be provided to the map service 220, which can determine route data 229, identifying, for example, a road segment that the vehicle is traveling on. The route determination component 224 can generate a current route 235 of the vehicle. The current route 235 can include a portion that has already been traveled, as well as a predicted portion that is based on, for example, a known or predicted destination of the vehicle for the trip. The destination can be determined from historical information obtained from vehicle, indicating the likely destination of the vehicle (e.g., going home on weekday afternoons, going to work on weekend mornings, etc.).

The usage determination component 240 operates to estimate a current fuel level of the vehicle. As an addition or alternative, the usage determination component 240 may operate to estimate a fuel consumption rate of the vehicle. In operation, the usage determination component 240 includes velocity logic 242 and/or acceleration logic 244. The velocity logic 242 correlates position information 227 with velocity. The acceleration logic 244 correlates position information 227 with the acceleration. The velocity logic 242 and/or acceleration logic 244 can operate to yield values over multiple instances of time, while the vehicle is on its current route 235. For example, the usage determination component 240 can determine a velocity and/or acceleration profile for the driver of the vehicle 5. The velocity and/or acceleration profiles can enable the manner in which the driving habits of the driver affect fuel consumption to be quantified and accounted for when fuel calculations and estimations are made.

In one implementation, usage determination component 240 implements fuel consumption model 241 in order to predict fuel consumption rate and/or vehicle fuel level using position information 227, fuel stop location 221 and information known about the vehicle type ("vehicle type information 243"; e.g., vehicle year and model, and size of gas tank). As mentioned, velocity and acceleration logic 242, 244 can correlate the position information 227 to velocity and acceleration. Additionally, the position information 227 can be used to obtain the current route 235. The fuel consumption model 241 can correlate these inputs to an accurate fuel consumption rate. Furthermore, given the fuel stop location 221 (e.g., as determined by the fuel stop determination component 230), the usage determination component 240 can predict or estimate the fuel level of the vehicle from the fuel consumption rate.

More specifically, fuel consumption model 241 can be based on an algorithmic learning model that is trained using ground truth data obtained from vehicles which generate the OBD data 113. The vehicle type information 243 can also be obtained for vehicles of the ground truth data set. The vehicle type information 243 can identify the size of the vehicle's fuel tank, as well as the manufacturer's published information on fuel consumption rate (including fuel capacity). The published fuel consumption rate is treated as an ideal value, but it can provide a basis for refinement and revision based on factors such as driving habits and/or road conditions. For vehicles of the ground truth data set, these revisions can first be predicted using velocity and acceleration parameters determined MCD data 105. The calculated fuel consumption rate can be then compared to calculations that utilize actual fuel levels of the vehicle over time, based on information contained in the OBD data 113. A linear regression formula may be used to scale the published fuel consumption rate based on their respective velocity and acceleration profiles. The parameters for the linear regression formula can be determined with comparison to fuel level determination made from OBD data 113. This comparison can tune the velocity and acceleration parameters to better reflect the fuel consumption rate as measured by the OBD data 113. In this way, the parameters can be weighted and applied in a linear regression formula that scales the published fuel consumption rate of the vehicle. In this way, the fuel consumption rate as determined by the usage determination component 240 reflects the driving habits of the user.

In some embodiments, the usage determination component 240 includes roadway logic 246 to determine roadway conditions which affect fuel consumption rate. Specifically, the usage determination component 240 can determine roadway conditions such as elevation changes and/or roadway quality (e.g., gravel road versus newly paved road, etc.). In one implementation, roadway logic 246 determines conditions from the current route 235. For example, roadway conditions (e.g., elevation, rough road) can be stored and accessed by the route determination component 224. The route determination component 224 can provide identify known road conditions that are present in the segments of the current route information 235. The route determination component 224 can obtain and utilize characterizations of the roadway conditions from multiple sources. These sources can include topographical mapping services, or alternatively, vehicles which employ onboard devices 10 that utilize sensors that can determine elevation (e.g., fixed accelerometer) or road quality (e.g., accelerometer, gyroscope, etc.).

In absence of roadway conditions determined from the current route information 235, the usage determination component 240 can use position information 227 to determine vehicle elevation changes on the vehicle's route. In particular, embodiments recognize that some mobile computing devices include GPS components which are sufficiently precise to identify elevation changes that are of significance to fuel consumption. Thus, the usage determination component can utilize position information 227 to determine changes in elevation that are significant enough to affect fuel consumption rate.

As still another example, the usage determination component 240 can use accelerometer information 239 in order to determine elevation changes to the vehicle 5. While mobile computing device 110 can be jostled or moved within the vehicle, a calibration algorithm can be implemented by one or more computer processors to calibrate accelerometer readings of the mobile computing device in instances when the devices are untouched within the vehicle. This accelerometer information can be communicated as, for example, part of sensor device data 205, so as to originate from the mobile computing device 110. In implementations in which onboard device 10 is used, the accelerometer can be fixed to the vehicle, so that the accelerometer data can better reflect hills or other elevation changes, as well as other roadway conditions such as bumpy or gravel roads.

The fuel consumption model 241 can also include parameters for roadway conditions. Specifically, roadway conditions can be determined using the position and/or accelerometer data provided from the mobile computing devices of the ground truth vehicles. The manner in which the roadway conditions affect fuel consumption rates can be parameterized based on a real-time comparison with the fuel level of the vehicle provided with the OBD data 113.

The usage determination component 240 can output a real-time estimation or prediction of the vehicle's fuel level 251, as well as the fuel consumption rate 253 of the vehicle over a current route or route segment. The fuel planning component 250 can utilize the current estimation to determine fuel planning measures when the estimated current fuel level 251 is below a fuel threshold (e.g., low fuel threshold). As an addition or alternative, the fuel planning component 250 can make predictions as to when or where the vehicle will reach empty. The fuel planning component 250 can make the predictions of based on the fuel level 251, the fuel consumption rate 253, and predicted routes or route segments.

In one implementation, when the estimated fuel level 251 of the vehicle reaches a fuel threshold (e.g., low fuel threshold), the fuel planning component 250 generates a search for fuel stations in the vicinity of the vehicle's current location and/or future location on a given route segment. For example, fuel planning component 250 can signal route criteria 261 to map services 220, which in turn returns fuel station locations 263 and fuel station prices 265. The fuel planning component 250 can include logic for selecting a recommended fuel station 245 based on the proximity of the fuel station to the current location of the vehicle, (or to a predicted location) and/or to the price. An optimal selection can account for the location for the additional distance needed to drive to the fuel station, as well as the relative price of the fuel station as compared to others nearby. The fuel planning component 250 can also update the fuel station recommendation 245 repeatedly, as the vehicle progresses on a route when the low fuel level threshold is met.

In another embodiment, the fuel planning component 250 determines predicted route information 237 for future trips of the vehicle. For example, a low fuel threshold may be signaled when the vehicle is nearing its destination. The route determination component 224 can use a route history data store 255 in order to predict the route segments of current routes, as well as the routes that the vehicle will likely take in the future. The predicted routes information 237 can be utilized by the fuel planning component 250. For example, the fuel planning component 250 can determine the number of miles left before the fuel tank is empty using the fuel level 251 and the fuel consumption rate 253. The fuel planning component 250 can locate an approximate fuel empty point on either the current route, or on a future predicted route as identified by the information 237, using the estimated number of miles left until empty. Likewise, the route determination component 224 can also estimate a time until empty using the position information 227 (for speed), as well as the estimate number of miles left before the fuel tank is empty. The determined time can be adjusted for the current route, or estimated for the future route.

Additionally, the fuel planning component 250 can based the route criteria 261 on a range or of locations that are within a distance before when the vehicles is expected to be empty. From this criteria, fuel station locations 263 can be identified in proximity to range. The fuel station recommendation 245 can be based on, for example, the least costly fuel station that the vehicle can readily access before empty is reached, assuming the predicted route 237.

The components described with system 200 can each store information that is associated with the driver or vehicle in the user database 215. In particular, incoming sensor device data 205 can be stored in association with the identifier 109 provided with MC data 105. Information can also be stored that is specific to a particular route or trip, as determined by the route determination component 224. Additionally, the determinations of fuel stop determination component 230, fuel usage determination component 240 and/or fuel planning component 250 can be recorded in the user database 215, in association with the identifier 109 and/or other information such as the date and time, as well as routes that have been either determined to have taken place or predicted.

An output interface 262 can be provided to communicate determinations and other results of the various components. For example, the output interface 262 can (i) generate application data for the service application 108 of the mobile computing device 110, and/or (ii) compose notifications and messages for the service application 108 that conveys determinations. The application data and notifications can, for example, notify the driver of fuel level being low, or of recommended fuel stops based on cost-savings. Among other information items, the output interface 262 can be used to communicate recommended fuel stops 245, as determined from the fuel planning component 250.

In some embodiments, a report 269 or other form of content can be generated from the output component 262 based on the outputs provided by the components of system 200. For example, a health service report can be communicated to a user interface of the service application 108, operating on the mobile computing device of the user. The report can be generated during or after the trip, and can provide feedback 247 as to the fuel consumption rate of the vehicle (based on output of the usage determination component 240). The information provided can indicate the estimated fuel consumption rate, and what could have been achieved had the user changed driving style (e.g., lessened the de-acceleration) or avoided a particular roadway. Additionally, the report can indicate miles left to the fuel tank being empty, the approximate amount of driving time left before the fuel tank is empty, the future route segment where the fuel tank can be expected to be empty, and an updated set of nearby fuel stations that can provide the most cost-effective refueling for the driver.

Methods

Figure 3A:
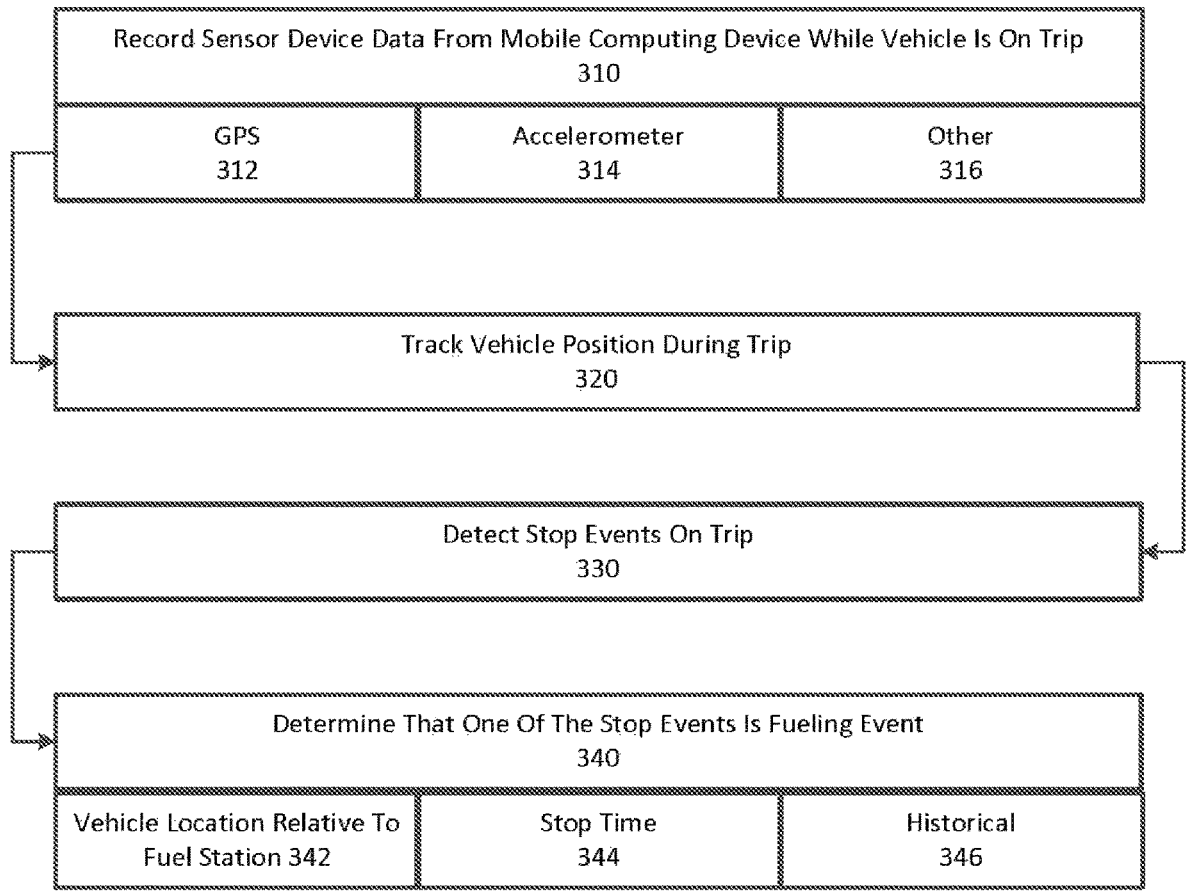
FIG. 3A illustrates an example method for using a mobile computing device that is carried in a vehicle to predict when a fuel stop occurs, in accordance with some embodiments.
Figure 3B:
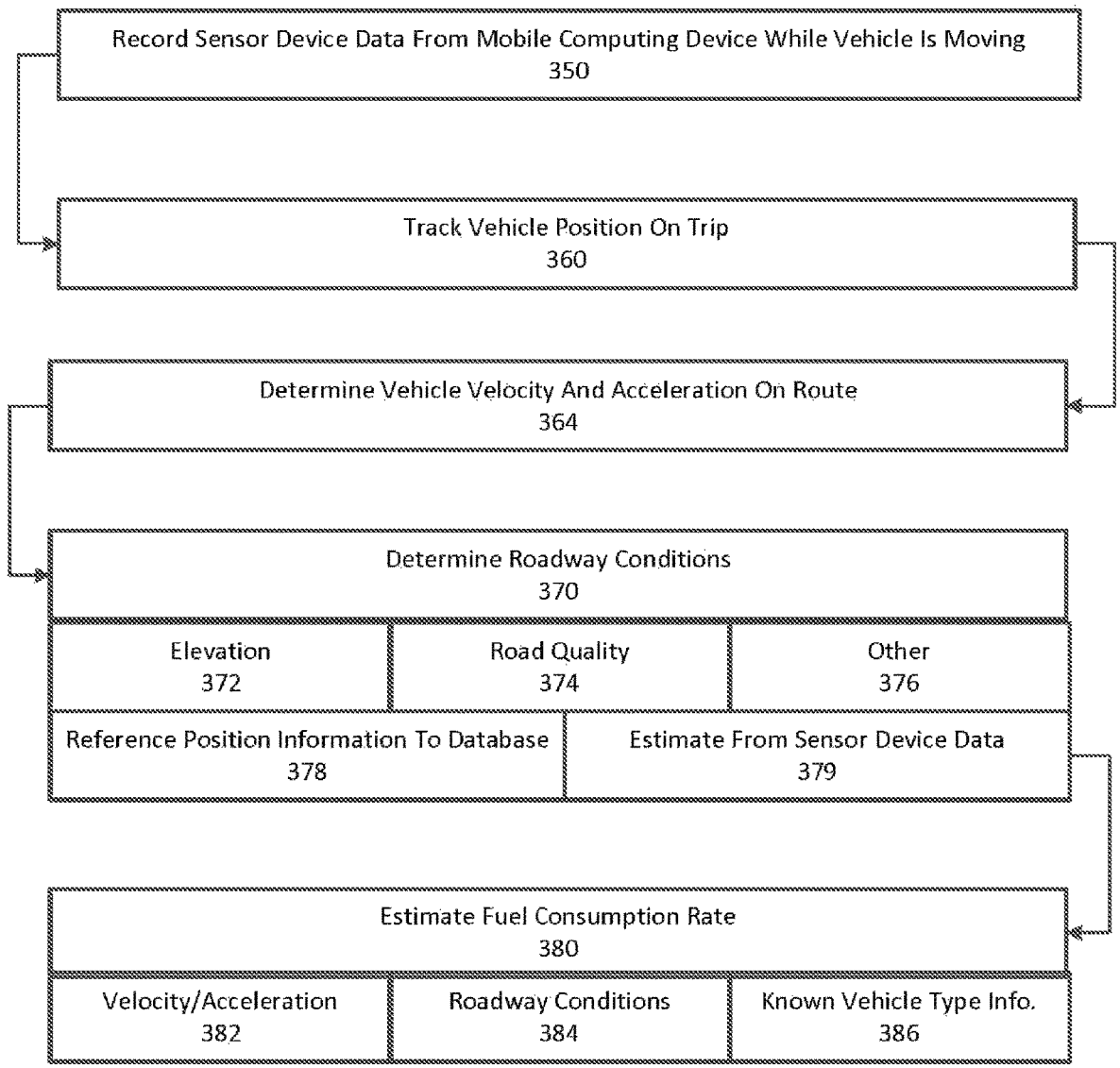
FIG. 3B illustrates an example method for using a mobile computing device that is carried in a vehicle to predict a fuel consumption rate of the vehicle, in accordance with some embodiments.
Figure 3C:
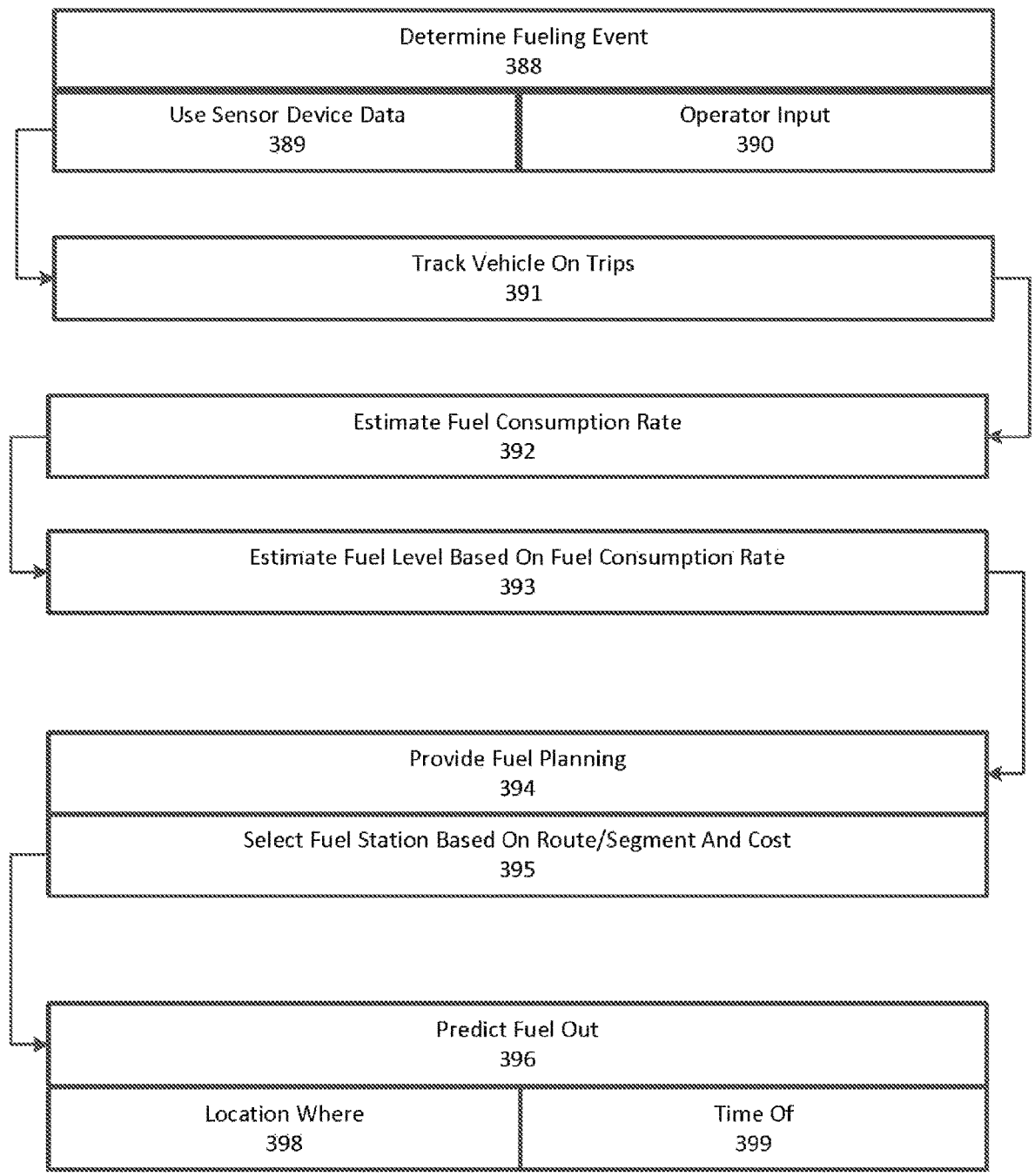
FIG. 3C illustrates an example method for using a mobile computing device that is carried in a vehicle to plan fuel intake for the vehicle, in accordance with some embodiments.

FIG. 3A illustrates an example method for using a mobile computing device that is carried in a vehicle to predict when a fuel stop occurs, according to an embodiment. FIG. 3B illustrates an example method for using a mobile computing device that is carried in a vehicle to estimate a fuel consumption rate of the vehicle, according to an embodiment. FIG. 3C illustrates an example method for using a mobile computing device that is carried in a vehicle to plan fuel intake for the vehicle, according to an embodiment. An example method such as described with FIG. 3A, FIG. 3B and FIG. 3C can be implemented using components such as described with examples of FIG. 1 or FIG. 2. Accordingly, in describing an example method of FIG. 3A, FIG. 3B and FIG. 3C, reference may be made to elements of FIG. 1 or FIG. 2 for purpose of illustrating a suitable component for performing a step or sub-step being described.

With reference to FIG. 3A, sensor device data is recorded from a mobile computing device while the vehicle is in motion (310). The recorded sensor data can include continuous or repeated transmissions of GPS data (312) and/or accelerometer data (314). In some variations, other sensor information can be used (316), such as data generated from a gyroscope. The mobile computing device can correspond to, for example, a cellular telephony/messaging device that is carried into the vehicle by the driver. The sensor device data can be generated when the vehicle initiates a trip. For example, the user can interact with the service application 108 in order to signal the beginning of a trip.

During the trip, the position of the vehicle can be tracked (320). In one implementation, GPS data generated from the GPS component 112 of the mobile computing device is read by the service application 108, which then communicates the information over a network to the fuel intake/planning service 120. Alternatively, additional programmatic resources can be resident on the mobile computing device to implement the fuel intake/planning service 120.

The stop events of the vehicle during the trip are recorded (330). The stop events can be detected by the system 200 analyzing the GPS data of the mobile computing device 110. Multiple stop events can be recorded, corresponding to, for example, the vehicle stopping at a red light with the ignition on, the vehicle parking for a period of time, or the vehicle being in traffic.

The multiple stop events can individually be analyzed to determine whether individual stop events can be considered fuel events 340. In particular, the location of each stop of can be referenced against nearby fuel stations (e.g., which can be obtained using the map service 220) (342). If the location of the stop event is sufficiently near a location of a fuel station so as to satisfy a proximity threshold, then the stop event can be considered a candidate for a fuel stop. The proximity threshold to the fuel station can be based on the accuracy of the GPS component 112. In some variations, the proximity threshold can be increased or decreased depending on the expected accuracy of the GPS component 112. For example, when the vehicle is near buildings, the GPS component 112 can be unreliable, and the proximity threshold for deeming the stop event to be a fuel stop can be increased.

When a candidate stop event is identified, the stop event can further be analyzed to determine if the duration of the stop was within a timing profile or criteria (344). By way of example, the stop event can be considered a fuel stop if the duration lasted more than a minimum threshold, but was less than a maximum threshold (e.g., indicating a parking event rather than a fuel event).

Historical information can also be used to influence or weight the determination of whether a stop event is a fuel event (346). For example, if a driver is known to use a particular fuel station, a stop event that is within the proximity threshold to that fuel station is more likely to be deemed a fuel event.

Additionally, the stop events can be recorded and evaluated (or reevaluated) retroactively based on additional acquired information regarding the fuel consumption or fuel level of the vehicle. For example, if the length of the vehicle's travel since a prior refueling significantly exceeds that vehicle's total mileage capability, the stop events can be reevaluated to identify one stop event that is most likely a refueling stop. By way of example, the determination can be re-weighted to account for location or historical information, under the assumption that the driver of the vehicle may have run an errand at the same time as refueling (thereby extending the stop time beyond what would be normal when typical refueling occurs).

When refueling occurs, one implementation provides that in assumption is made that the driver completely refueled the vehicle. A vehicle profile can be maintained that identifies the make, model and year the vehicle. The size of the gas tank can be determined from a vehicle library, so that the total amount of gas within the vehicle can be estimated. A user may be alerted (e.g., through a user interface of the service application 108) to enable the user to input alternative values that approximate the amount of fuel intake, if not a full tank.

With reference to FIG. 3B, the sensor device data of the mobile computing device can be read while the vehicle is on a trip (350). For example, the service application 108 can read and communicate the sensor device data to the fuel intake/planning service 120. The vehicle position can be detected while it is on the trip (360). The sensor device data provided from the vehicle can be used to determine vehicle velocity and/or acceleration of the vehicle, and the determinations can be made repeatedly, or on multiple instances of the trip (364). The usage determination component 240 can, for example, include velocity logic 242, and acceleration logic 244 to determine velocity and acceleration information based on the position information of the vehicle on the trip.

Additionally, the sensor device data can be used to determine roadway conditions for road segments that the vehicle takes during the trip (370). The usage determination component 240 can include roadway logic 246 for interpreting the sensor device data as including roadway conditions such as elevation or road quality. The determined road conditions for the vehicle can correspond to one or more of (i) elevation changes in the road segment being taken by the vehicle (372), and/or (ii) the road quality of the road segments (374). Other road conditions can also be determined from the sensor device data of the mobile computing device 110 (376). For example, other road conditions can correspond to road segment with windy turns.

In one implementation, the roadway logic 246 can reference the position information of the vehicle against a library of road segments with known road conditions (e.g., elevation, good pavement, etc.) (378). Thus, the position information can be used to determine the road conditions, using a library of known information.

In a variation, one or more types of road conditions can be determined from calculations made using the sensor device data, without use of prior knowledge regarding road conditions (379). In particular, elevation changes can be determined from output of the GPS component 112 on the mobile computing device 110. In a variation, the accelerometer of the mobile computing device 110 can be calibrated to detect elevation changes. Other road conditions, such as the presence of gravel or multi-road conditions can be detected through monitoring the accelerometer. For example, certain road conditions such as gravel roads can have an accelerometer profile associated there with, which went detected can indicate the presence of gravel.

The fuel consumption rate of the vehicle can then be estimated (380). The fuel consumption rate can be based in part on the velocity and/or acceleration of the vehicle over the course of the trip (382). Additionally, the fuel consumption rate can be calculated to account for roadway conditions that would detract or improve the fuel consumption rate (384).

In determining the fuel consumption rate, information pertaining to the fuel consumption of the vehicle type (e.g., make, model or year) is identified (386). The usage determination component 240 can use the information as a basis for calculating a more precise fuel consumption rate. For example, a linear regression formula can be used which selects and waits parameters that affect a baseline fuel consumption rate. The baseline fuel consumption rate can be determined from information known about the vehicle type. However, such information can represent an ideal environment, and be inaccurate as applied to real-world conditions. Accordingly, the baseline fuel consumption rate can be set to some percentage of the published fuel consumption rate (e.g., 85%). The parameters to influence the fuel consumption rate can then be based on the determined velocity and acceleration information, as well as the determine roadway conditions. The parameters can be applied in a linear regression formula against the baseline value in order to estimate the driver's fuel consumption rate.

With reference to FIG. 2, the usage determination component 240 can determine the fuel consumption rate of the vehicle. The fuel consumption model 241 can be used to determine the appropriate parameters and weights for the vehicle. In one implementation, parameters and weights can be set by vehicles that comprise the ground truth data set. These vehicles can carry onboard device 10 and generate OBD data 113. The ground truth vehicles can provide a basis for comparing and tuning parameters representing velocity, acceleration and road conditions based on comparison of fuel consumption calculations that utilize sensor device data against actual fuel level determinations provided with the OBD data 113. A learning algorithm, such as K-Means Clustering, can also be developed with the ground truth data in order develop and tune the representative parameters for velocity, acceleration and road conditions.

With reference to FIG. 3C, a fueling event can be identified for a vehicle. In particular, the location and time with a refueling stop occurred can be recorded (388). In one implementation, the fueling event is determined automatically (or substantially automatically) from the sensor device data of the mobile computing device 110 (389). This determination can be made using for example, processes and logic provided with the fuel stop determination component 230. As an addition or alternative, user input may be received to identify the fueling event (390). For example, the user can confirm the fueling event, or provide input that identifies where refueling took place. When the refueling stop is determined, an assumption can be made that the refueling completely fills the fuel tank of the vehicle, and the capacity of the fuel tank may be known from public information about the type of vehicle being driven. As an alternative or addition, the amount of fuel put into the vehicle can be based on user input. For example, if the user fails to completely fill the tank, the user can provide input through a user interface of the service application 108 that indicates the amount of fuel that was put into the tank.

After refueling, the vehicle can be tracked over the course of one or more trips (391). The fuel consumption rate of the vehicle can be estimated as the vehicle is tracked (392). The fuel consumption rate can be determined using, for example, processes described usage determination component 240, and/or an example of FIG. 3A. The fuel level of the vehicle can also be estimated on an ongoing basis, using the estimated fuel consumption rate and the location of the prior fuel stop (393).

The fuel planning component 250 can predict future route segments, future trips, and routes taken on the future trip (based on user history, such as work schedule etc.) in order to provide fuel planning information to the user (394). In one implementation, the fuel planning information calculates the most cost-effective locations where refueling can take place for the user, based on pricing information provided by the map service 220 four fuel stations (395). When, for example, the vehicle fuel level is determined to be at or below a low fuel threshold, a set of recommended fuel stations can be provided to the driver. The recommended set can include a fuel station close to the user's present location, or a fuel station that the user will be near if the predicted route segment or trip takes place in the future (e.g., driver goes to work on the next trip). The recommended set of fuel stations can be updated based as the vehicle is driven, responsive to events and/or routes taken by the vehicle.

As an alternative or addition, the fuel planning component 250 can predict when the fuel of the vehicle will be out (396). The prediction can be communicated to the driver by way of (i) total mileage or distance remaining until fuel out, (ii) expected location on a future route or trip (398), and (ii) expected time of day (399), given the expected route or trips that are to be taken before the fuel out point.

Computer Systems

Figure 4:
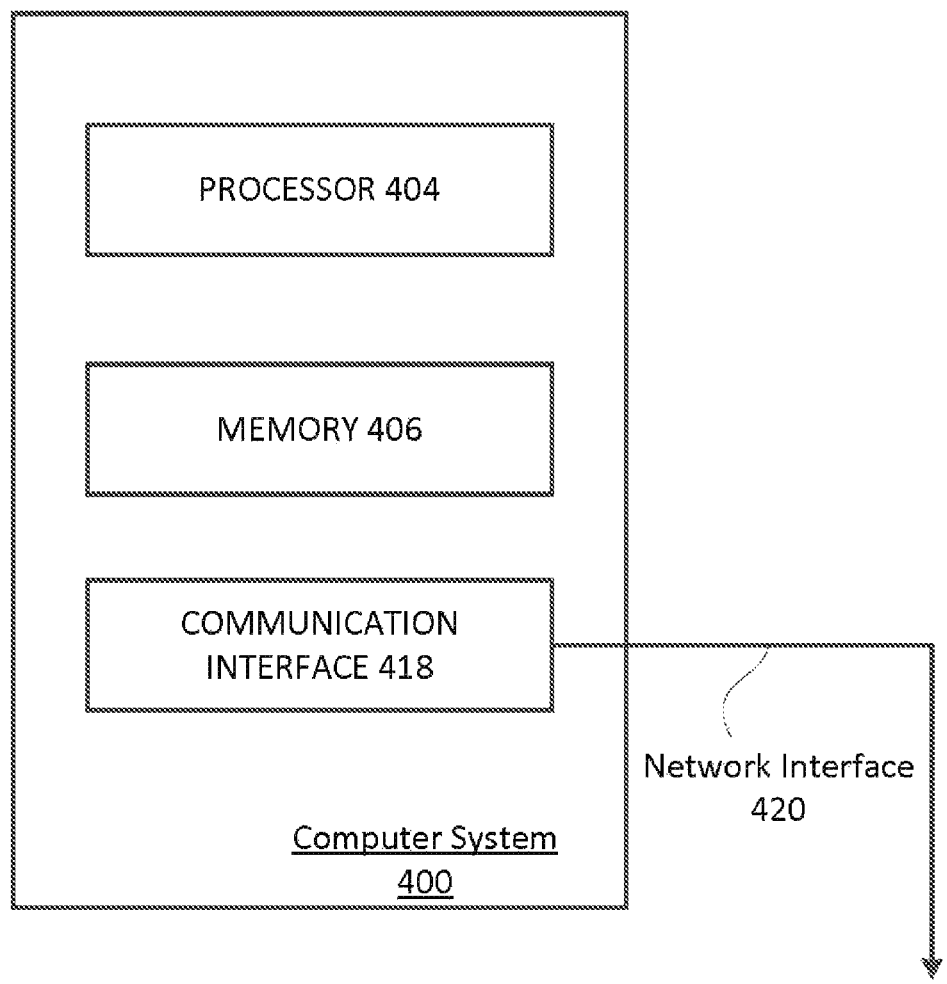
FIG. 4 illustrates a computing system on which embodiments can be implemented.

FIG. 4 is a block diagram that illustrates a computer system upon which embodiments described herein may be implemented. For example, a system such as described with FIG. 2 can be implemented on a computer system such as described with an example of FIG. 2. Likewise, a method such as described with an example of FIG. 3A, FIG. 3B or FIG. 3C can also be implemented using a computing system such as described with FIG. 4.

In an embodiment, computer system 400 includes processor 404, memory 406 (including non-transitory memory), storage device, and communication interface 418. The memory 406 can include random access memory (RAM) or other dynamic storage resources, for storing information and instructions to be executed by processor 404. The memory 406 also may be used for storing temporary variables or other intermediate information during execution of instructions to be executed by processor 404. The memory 406 may also include a read only memory (ROM) or other static storage device for storing static information and instructions for processor 404. A storage device, such as a magnetic disk or optical disk, is provided for storing information and instructions. The communication interface 418 may enable the computer system 400 to communicate with one or more networks through use of the network link 420 (wireless or wireline).

In one implementation, memory 406 may store instructions for implementing functionality such as described with an example of FIG. 2, or implemented through an example method such as described with FIG. 3A, FIG. 3B or FIG. 3C. Likewise, the processor 404 may execute the instructions in providing functionality as described with a system such as described with FIG. 2, or with an example method such as described with FIG. 3A, FIG. 3B or FIG. 3C.

Embodiments described herein are related to the use of computer system 400 for implementing the techniques described herein. According to one embodiment, those techniques are performed by computer system 400 in response to processor 404 executing one or more sequences of one or more instructions contained in main memory 406. Such instructions may be read into main memory 406 from another machine-readable medium, such as a storage device. Execution of the sequences of instructions contained in main memory 406 causes processor 404 to perform the process steps described herein. In alternative embodiments, hard-wired circuitry may be used in place of or in combination with software instructions to implement embodiments described herein. Thus, embodiments described are not limited to any specific combination of hardware circuitry and software.

Figure 5:
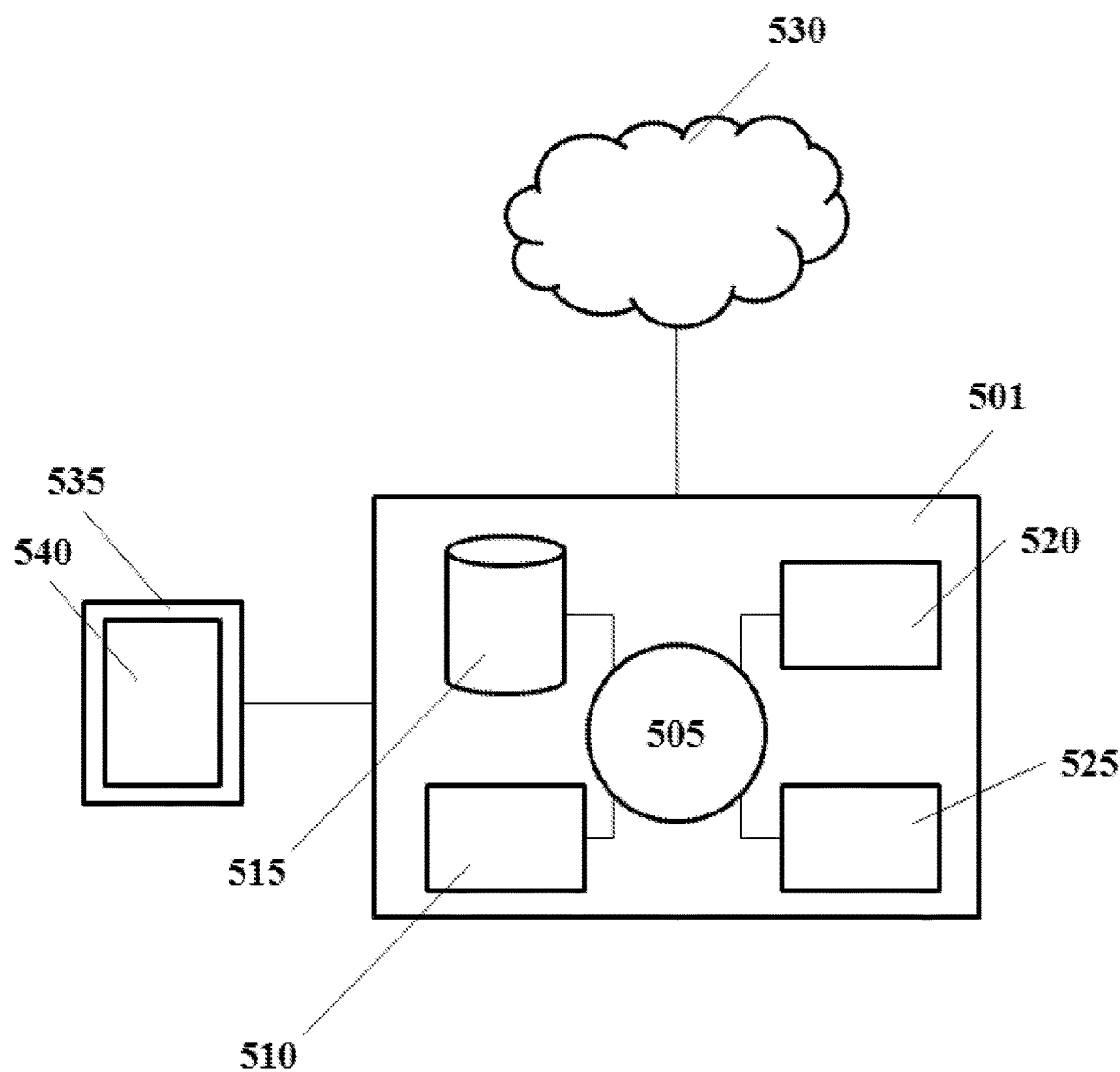
FIG. 5 schematically illustrates a computer system that is programmed or otherwise configured to implement methods of the present disclosure.

FIG. 5 shows another computer system 501 that is programmed or otherwise configured to implement methods and systems of the present disclosure, such as determining or providing fuel information of a vehicle. The computer system 501 can regulate various aspects of methods and systems of the present disclosure. The computer system 501 can be the MCD 110. As an alternative, the computer system 501 can be a computer server.

The computer system 501 includes a central processing unit (CPU, also "processor" and "computer processor" herein) 505, which can be a single core or multi core processor, or a plurality of processors for parallel processing. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure. Examples of operations performed by the CPU 505 can include fetch, decode, execute, and writeback.

The CPU 505 can be part of a circuit, such as an integrated circuit. One or more other components of the system 501 can be included in the circuit. In some cases, the circuit is an application specific integrated circuit (ASIC).

The storage unit 515 can store files, such as drivers, libraries and saved programs. The storage unit 515 can store user data, e.g., user preferences and user programs. The computer system 501 in some cases can include one or more additional data storage units that are external to the computer system 501, such as located on a remote server that is in communication with the computer system 501 through an intranet or the Internet.

The computer system 501 can communicate with one or more remote computer systems through the network 530. For instance, the computer system 501 can communicate with a remote computer system of a user (e.g., operator or passenger of a vehicle). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 535 that comprises a user interface (UI) 540 for providing, for example, fuel information of the vehicle (e.g., predicted fuel event, fuel level, or fuel intake). Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 505. The algorithm can, for example, determine vehicle information (e.g., fuel level, fuel usage, or predicting fuel level or a fueling event). The algorithm may be a machine learning algorithm (e.g., support vector machine), which may use user feedback to improve the determination of vehicle information. The UI 540 may include graphical elements that permit the user to provide feedback. For example, the computer system 501 may query the user about the actual fuel level and the user can provide the computer system the actual fuel level (e.g., 25% full), which can enable the computer system to improve the algorithm to predict the fuel level. This can permit the computer system 501 to use the feedback to improve the manner in which the computer system 501 provides such information.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for providing a usage of a vehicle using a mobile computing device onboard said vehicle, comprising:
   (a) when said vehicle is in motion, (i) using one or more sensors of said mobile computing device to collect data including global position system (GPS) data or motion data, and (ii) using said mobile computing device to process said data to detect a stop event of said vehicle;
   (b) upon detecting said stop event, using said mobile computing device to automatically determine a duration and a geographic location of said stop event from said data;
   (c) using a trained machine learning algorithm to determine that said stop event is a fueling event based at least in part on said duration and said geographic location determined in (b);
   (d) using at least said fueling event to estimate said usage of said vehicle; and
   (e) providing said usage of said vehicle on a graphical user interface (GUI) of said mobile computing device.

2. The method of claim 1, further comprising providing an indication of said fueling event on said GUI of said mobile computing device.

3. The method of claim 1, wherein said one or more sensors comprises a global positioning system.

4. The method of claim 1, wherein said one or more sensors comprises an accelerometer.

5. The method of claim 1, wherein said machine learning algorithm is trained using user feedback.

6. The method of claim 5, wherein said user feedback comprises feedback from a user of said mobile computing device.

7. The method of claim 1, wherein said machine learning algorithm is trained using user feedback and sensor data provided by one or more sensors of said vehicle.

8. The method of claim 1, wherein said usage of said vehicle comprises a fuel level computed based at least in part on said geographic location of said fueling event determined in (c) and a fuel consumption rate.

9. The method of claim 8, wherein said fuel consumption rate is determined based at least in part on a velocity profile or acceleration profile of said vehicle.

10. The method of claim 8, further comprising determining a road condition for said vehicle, and determining said fuel consumption rate based at least in part on said road condition.

11. A mobile computing device programmed to provide a usage of a vehicle, comprising:
   one or more sensors; and
   a computer processor operatively coupled to said one or more sensors, wherein said computer processor is programmed to:
      (i) when said vehicle is in motion, (a) use said one or more sensors to collect data including global position system (GPS) data or motion data, and (b) process said data to detect a stop event of said vehicle,
      (ii) upon detecting said stop event, automatically determine a duration and a geographic location of said stop event from said data,
      (iii) use a trained machine learning algorithm to determine that said stop event is a fueling event based at least in part on said duration and said geographic location determined in (ii);
      (iv) use at least said fueling event to estimate said usage of said vehicle; and
      (v) provide said usage of said vehicle on a graphical user interface (GUI) of said mobile computing device.

12. The system of claim 11, wherein said computer processor is programmed to provide an indication of said fueling event on said GUI of said mobile computing device.

13. The system of claim 11, wherein said one or more sensors comprises a global positioning system.

14. The system of claim 11, wherein said one or more sensors comprises an accelerometer.

15. The system of claim 11, wherein said machine learning algorithm has been trained using user feedback.

16. The system of claim 11, wherein said machine learning algorithm has been trained using user feedback and sensor data provided by one or more sensors of said vehicle.

17. The system of claim 11, wherein said usage of said vehicle comprises a fuel level, and wherein said computer processor is programmed to compute said fuel level based at least in part on said geographic location of said fueling event determined in (iii) and a fuel consumption rate.

18. The system of claim 17, wherein said computer processor is programmed to determine said fuel consumption rate based at least in part on a velocity profile or acceleration profile of said vehicle.

19. The system of claim 17, wherein said computer processor is programmed to (1) determine a road condition for said vehicle and (2) determine said fuel consumption rate based at least in part on said road condition.

* * * * *